UNITED STATES PATENT OFFICE.

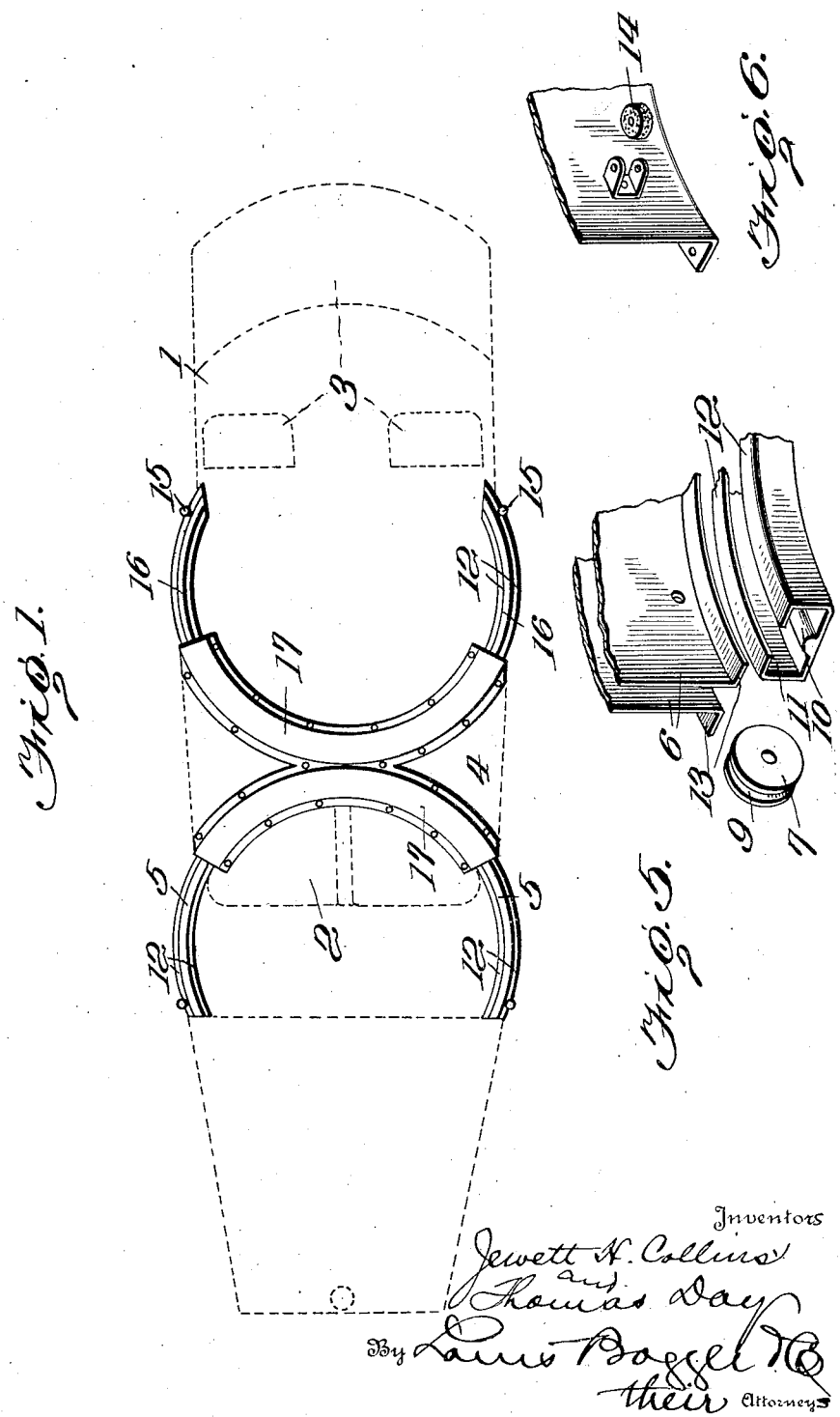

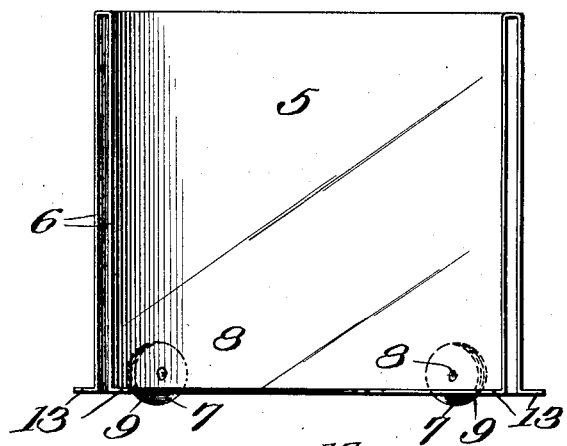
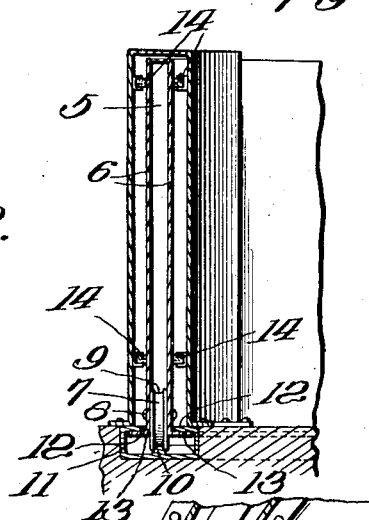
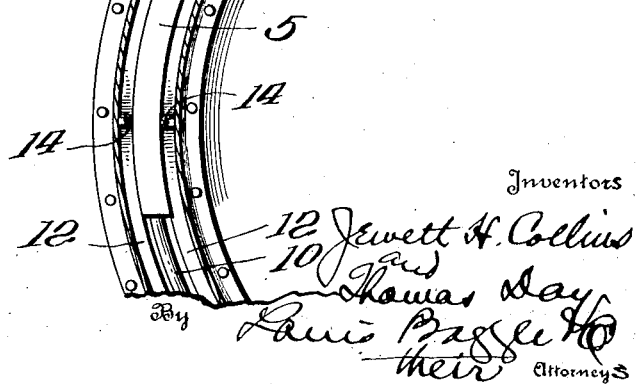

JEWETT H. COLLINS, OF COLUMBIA, AND THOMAS DAY, OF MOOSUP, CONNECTICUT.

SLIDING DOOR FOR AUTOMOBILE-BODIES.

1,334,132.  Specification of Letters Patent.  Patented Mar. 16, 1920.

Application filed June 15, 1917. Serial No. 174,991.

*To all whom it may concern:*

Be it known that we, JEWETT H. COLLINS and THOMAS DAY, citizens of the United States, residing at Columbia, county of Tolland, and State of Connecticut, and at Moosup, in the county of Windham and State of Connecticut, respectively, have invented certain new and useful Improvements in Sliding Doors for Automobile-Bodies, of which the following is a specification.

Our invention relates to an improvement in sliding-doors for automobile bodies, and appertains more particularly to a sliding-door which is readily operated, and which, in its open position, is out of sight. An object of the invention is to provide a sliding door which utilizes heretofore waste spaces in the body of the car. A further object of the invention is to so locate the doors that both the front door and the door to the tonneau may be opened by drawing them together. Other objects and advantages will appear when the description is read in connection with the accompanying drawings, in which:—

Figure 1 is a top plan view of an automobile body;

Fig. 2 is a side elevation of a door;

Fig. 3 is a vertical section through the door and its rail;

Fig. 4 is a horizontal section through the door; and

Figs. 5 and 6 are details.

The body 1 is provided with the customary front seat 2, and rear seat 3, and the back 4 of the seat 2 is made hollow to receive the sliding doors 5, 5. As disclosed in Fig. 3, the door 5 comprises a hollow casing 6 forming an arc of a circle, and having two or more rollers 7, 7, supported on axles 8, which are in turn journaled in the sides 6 of the door. The wheels 7 are grooved as at 9, and are adapted to run upon a circular track 10 located below the floor line. The track 10 is located in a channel 11, provided with overhanging plates 12, 12, which are separated far enough to permit the ready passage of the door longitudinally of the channel formed thereby, and which prevent the jumping of the wheels 7 from the track 10 by means of the outwardly turned flanges 13, 13 on the sides 6, 6, of the door 5 impinging thereagainst.

In order to prevent motion laterally to the channel, rubber rollers 14, 14, are provided on the sides of the seat back 4. It will be obvious that the door 5 may be seized by the knob or some similar handle 15 and rolled back out of sight in the seat back 4.

It is equally obvious that the back door may be similarly constructed, with the exception that rear door 16 slides into the curved housing of the tonneau. It will be seen that it will thus be possible for an attendant with his two hands to seize and open both doors simultaneously by pushing them toward each other, when they will slide back in their respective channels out of sight.

It is believed the advantages of such an invention are obvious.

We claim:

1. The combination with a vehicle body, and a hollow curved casing, a correspondingly curved channel having a track therein, and overhanging flanges projecting inwardly from the sides thereof forming a slot, of a door comprising a hollow casing curved correspondingly to the first mentioned casing, and adapted to fit and move therein, the lower edges of the door casing having outwardly extending flanges which fit beneath the flanges of the channel, and rollers upon which the door is mounted to travel on the track in the channel.

2. The combination with a vehicle body, of two curved housings disposed in opposite directions, and doors correspondingly curved slidable in the ends of the housings, the housings and doors at adjacent ends being sufficiently close to each other so that the attendant can conveniently operate both doors at a side of the vehicle simultaneously.

3. The combination with a double hollow seat back, the parts of which curve from each other in the general form of a letter X, of doors fitted within the parts of the back and adapted to travel endwise therein.

4. The combination with a vehicle body and a double hollow seat back, the parts of which curve from each other in the general form of a letter X, of doors fitted within the parts of the back and adapted to travel endwise therein, rollers for supporting the doors and upon which they travel, and rollers for the lateral support of the doors.

5. The combination with a vehicle body, and a double curved hollow seat back, the two parts of which are back to back and curved in the general form of a letter X, curved channels having tracks therein, and inturned flanges whereby slots are formed and over which the double hollow seat back is secured, of doors comprising a hollow casing curved correspondingly to the backs and adapted to slide therein, rollers on which these doors are mounted, said rollers traveling on the tracks in the channels, and the door casing having outturned means at or near the lower edge fitting under the flanges of the channels, whereby to hold the doors in sliding position in their travel within the hollow seat back.

In testimony whereof we affix our signatures.

JEWETT H. COLLINS.
THOMAS DAY.